(12) United States Patent
Barbieri et al.

(10) Patent No.: US 9,516,686 B2
(45) Date of Patent: Dec. 6, 2016

(54) METHOD AND APPARATUS FOR ESTABLISHING AND MAINTAINING PEER-TO-PEER (P2P) COMMUNICATION ON UNLICENSED SPECTRUM

(75) Inventors: Alan Barbieri, San Diego, CA (US); Naga Bhushan, San Diego, CA (US); Ravi Palanki, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 13/046,176

(22) Filed: Mar. 11, 2011

(65) Prior Publication Data

US 2011/0228666 A1 Sep. 22, 2011

Related U.S. Application Data

(60) Provisional application No. 61/314,972, filed on Mar. 17, 2010.

(51) Int. Cl.
*H04W 72/04* (2009.01)
*H04W 24/00* (2009.01)
(Continued)

(52) U.S. Cl.
CPC .................... *H04W 76/023* (2013.01)

(58) Field of Classification Search
CPC ........ H04W 76/023; H04W 76/00; H04B 7/00
(Continued)

(56) References Cited

U.S. PATENT DOCUMENTS 832,350 A 10/1906 Thomas
7,013,158 B1 * 3/2006 Cook ........................... 455/519
(Continued)

FOREIGN PATENT DOCUMENTS

CN 1666443 A 9/2005
EP 1988724 A1 11/2008
(Continued)

OTHER PUBLICATIONS

Kelly Martin, "Operator licenses, station licenses, and licensing-by-rule", Dec. 8, 2009, Nonbovine Ruminations, pp. 1-3.*
(Continued)

*Primary Examiner* — Andrew Lai
*Assistant Examiner* — Albert Shih
(74) *Attorney, Agent, or Firm* — James K. O'Hare

(57) ABSTRACT

Techniques for establishing and maintaining peer-to-peer (P2P) communication are described. In an aspect, P2P communication on an unlicensed spectrum may be established and maintained with network assistance. In one design, a user equipment (UE) may communicate with a wide area network (WAN) to establish P2P communication with at least one other UE on a first frequency band that is not licensed to the WAN. For example, the UE may receive an assignment of at least one frequency channel in the first frequency band for P2P communication. The UE may then communicate peer-to-peer with the other UE(s) on the at least one frequency channel. The UE may also communicate with the WAN to maintain P2P communication with the other UE(s), e.g., to switch to another frequency channel if necessary.

26 Claims, 7 Drawing Sheets

(51) Int. Cl.
*H04W 36/30* (2009.01)
*H04W 76/02* (2009.01)

(58) Field of Classification Search
USPC .............. 455/422.1, 552.1, 41.2, 518, 519, 416,455/426.1; 370/216, 241, 328, 329, 331, 337, 370/341
See application file for complete search history.

(56) References Cited

U.S. PATENT DOCUMENTS

| | | | |
|---|---|---|---|
| 7,502,624 B2* | 3/2009 | Rasanen | 455/552.1 |
| 8,248,996 B2* | 8/2012 | Li et al. | 370/328 |
| 8,265,690 B2* | 9/2012 | Erceg et al. | 455/552.1 |
| 8,320,350 B2* | 11/2012 | Messerges et al. | 370/341 |
| 8,331,333 B2* | 12/2012 | Kogawa et al. | 370/337 |
| 8,712,456 B2* | 4/2014 | Feng et al. | 455/501 |
| 2006/0252369 A1 | 11/2006 | Rasanen | |
| 2008/0002647 A1 | 1/2008 | Laroia et al. | |
| 2009/0258639 A1 | 10/2009 | Nystrom et al. | |
| 2013/0048720 A1* | 2/2013 | Lewis | 235/382 |

FOREIGN PATENT DOCUMENTS

| | | |
|---|---|---|
| JP | 2000269884 A | 9/2000 |
| JP | 2007512752 A | 5/2007 |
| JP | 2008078807 A | 4/2008 |
| JP | 2009527170 A | 7/2009 |
| JP | 2011523265 A | 8/2011 |
| JP | 2011524126 A | 8/2011 |
| WO | WO-2005053346 A1 | 6/2005 |
| WO | WO-2007082250 A2 | 7/2007 |
| WO | WO-2007093653 A1 | 8/2007 |
| WO | WO-2009101537 A2 | 8/2009 |
| WO | WO-2009137205 A2 | 11/2009 |
| WO | WO-2009148393 A1 | 12/2009 |
| WO | WO-2009148401 A1 | 12/2009 |

OTHER PUBLICATIONS

FCC Encyclopedia, "Family Radio Service (FRS)", FCC, pp. 1-3.*
International Search Report and Written Opinion—PCT/US2011/028555—ISA/EPO—Jun. 14, 2011.

* cited by examiner

METHOD AND APPARATUS FOR ESTABLISHING AND MAINTAINING PEER-TO-PEER (P2P) COMMUNICATION ON UNLICENSED SPECTRUM

The present application claims priority to provisional U.S. Application Ser. No. 61/314,972, entitled "METHOD AND APPARATUS FOR ESTABLISHING PEER-TO-PEER (P2P) COMMUNICATION ON UNLICENSED SPECTRUM," filed Mar. 17, 2010, and incorporated herein by reference in its entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may also be able to communicate peer-to-peer with one or more other UEs. It may be desirable to efficiently support P2P communication for UEs.

SUMMARY

Techniques for establishing and maintaining P2P communication for UEs on an unlicensed spectrum are described herein. In an aspect, P2P communication on an unlicensed spectrum may be established and maintained with network assistance. In one design, a UE may communicate with a wide area network (WAN) to establish P2P communication with at least one other UE on a first frequency band that is not licensed to the WAN. In one design, the UE may send a request for P2P communication to the WAN and may thereafter receive at least one frequency channel in the first frequency band to use for P2P communication. The UE may thereafter communicate peer-to-peer with the at least one other UE on the at least one frequency channel assigned for P2P communication. The UE may also communicate with the WAN to maintain P2P communication with the at least one other UE. The UE may communicate with the WAN on a second frequency band on which the WAN is licensed. The UE may thus communicate with the WAN and the other UE(s) on different licensed and unlicensed frequency bands.

In one design, a network entity (e.g., a base station) may communicate with a UE to establish P2P communication between the UE and at least one other UE on a first frequency band that is not licensed to a WAN. The network entity may also communicate with the UE to maintain P2P communication between the UE and the at least one other UE. The network entity may communicate with the first UE on a second frequency band on which the WAN is licensed.

In another aspect, P2P communication on an unlicensed spectrum may be supported with sensing. A UE may communicate peer-to-peer with at least one other UE on at least one frequency channel in a frequency band that is not licensed to a WAN. The UE may monitor the at least one frequency channel to detect usage of the at least one frequency channel by at least one licensed user of the frequency band. The UE may terminate P2P communication on the at least one frequency channel when usage of the at least one frequency channel by the at least one licensed user is detected. The UE may also terminate P2P communication when unlicensed users are detected or when performance degrades.

In yet another aspect, P2P communication on an unlicensed spectrum may be supported with a list of frequency channels. A UE may receive a list of frequency channels in a frequency band that is not licensed to a WAN but is available for use for P2P communication. The UE may communicate peer-to-peer with at least one other UE on a first frequency channel in the list. The UE may decide to perform handover from the first frequency channel to a second frequency channel in the list, e.g., due to a licensed user being detected on the first frequency channel. The UE may perform handover from the first frequency channel to the second frequency channel and may thereafter communicate P2P with the at least one other UE on the second frequency channel.

In yet another aspect, a base station may cooperate with at least one network entity (e.g., at least one other base station) in a WAN to support P2P communication for UEs on an unlicensed spectrum. In one design, the base station may communicate with the at least one network entity to determine at least one frequency channel available for use for P2P communication. The at least one frequency channel may belong in a frequency band that is not licensed to the WAN. The base station may assign the at least one frequency channel to UEs for P2P communication.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
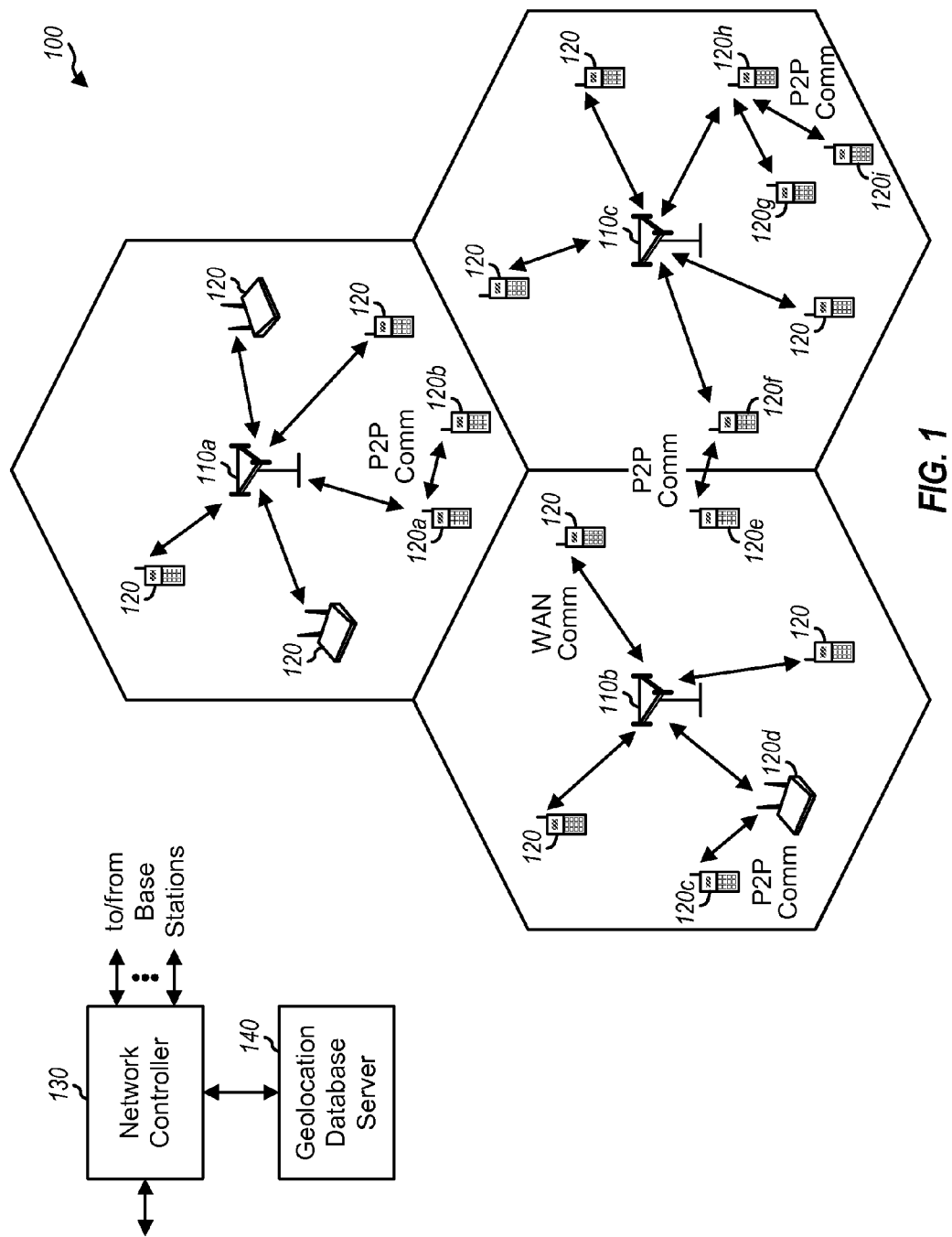
FIG. 1 shows a wireless communication network.

FIG. 1 shows a WAN 100, which may be a LTE network or some other WAN. WAN 100 may include a number of base stations and other network entities. For simplicity, only three base stations 110a, 110b and 110c and one network controller 130 are shown in FIG. 1. A base station may be an entity that communicates with the UEs and may also be referred to as a Node B, an evolved Node B (eNB), an access point, etc. Each base station may provide communication coverage for a particular geographic area and may support communication for the UEs located within the coverage area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, WAN 100 includes macro base stations 110a, 110b and 110c for macro cells. WAN 100 may also include pico base stations for pico cells and/or femto/home base stations for femto cells (not shown in FIG. 1).

Network controller 130 may couple to a set of base stations and may provide coordination and control for these base stations. Network controller 130 may communicate with the base stations via a backhaul. The base stations may also communicate with one another via the backhaul. A geolocation database server 140 may couple to network controller 130 and/or other network entities. Server 140 may support communication on an unlicensed spectrum, as described below.

UEs 120 may be dispersed throughout WAN 100, and each UE may be stationary or mobile. A UE may also be referred to as a station, a mobile station, a terminal, an access terminal, a subscriber unit, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A UE may be able to communicate with base stations, relays, other UEs, etc.

In the description herein, WAN communication refers to communication between a UE and a base station, e.g., for a call with a remote station such as another UE. An access link refers to a communication link between a UE and a base station. P2P communication refers to direct communication between two or more UEs, without going through a base station. A P2P link refers to a communication link between two or more UEs engaged in P2P communication. A P2P group refers to a group of two or more UEs engaged in P2P communication. In one design, one UE in a P2P group may be designated as a P2P server, and each remaining UE in the P2P group may be designated as a P2P client. The P2P server may perform certain management functions such as exchanging signaling with a WAN, coordinating data transmission between the P2P server and the P2P client(s), etc.

In the example shown in FIG. 1, UEs 120a and 120b are under the coverage of base station 110a and are engaged in P2P communication. UEs 120c and 120d are under the coverage of base station 110b and are engaged in P2P communication. UEs 120e and 120f are under the coverage of different base stations 110b and 110c and are engaged in P2P communication. UEs 120g, 120h and 120i are under the coverage of the same base station 110c and are engaged in P2P communication. The other UEs 120 in FIG. 1 are engaged in WAN communication.

WAN 100 may operate on one or more frequency channels that are licensed to a network operator. WAN 100 may support both WAN communication and P2P communication on the licensed frequency channel(s). In this case, some resources on the licensed frequency channel(s) may be reserved for P2P communication and the remaining resources may be used for WAN communication.

The entire frequency spectrum may be partitioned into different frequency bands (or simply, "bands" in the description herein) by regulatory bodies such as the Federal Communications Commission (FCC) in the United States. Each frequency band may cover a specific range of frequencies and may be designated for certain use. For example, in the United States, the frequency band from 698 to 806 MHz is used for television (TV) broadcast, the frequency bands from 824 to 885 MHz (cellular band) and from 1850 to 1990 MHz (PCS band) are used for cellular phone, etc. Each frequency band may be divided into a number of frequency channels (or simply, "channels" in the description herein). For example, the frequency band from 698 to 806 MHz is divided into eighteen 6 MHz channels corresponding to TV channels 52 to 69. In the description herein, the term "spectrum" generally refers to a range of frequencies, which may be a frequency band, a frequency channel, etc.

All or part of a frequency band may be licensed to a particular operator for a particular geographic area. A frequency band that is licensed to an operator may be referred to as a licensed band, a licensed spectrum, etc. The licensed operator may support users operating on the frequency band.

A user that is licensed to use a particular frequency band may be referred to as a primary or licensed user of that frequency band. A user that is not licensed to use a particular frequency band may be referred to as a secondary or unlicensed user. There may be multiple tiers of primary users having different priorities on a given frequency band. For example, military or public safety users may be higher priority primary users of a given frequency band, and cellular users may be lower priority primary users of the same frequency band. Lower priority primary users may be required to vacate the frequency band when higher priority primary users operate on the frequency band. For clarity, in much of the description herein, the terms "licensed" and "unlicensed" are from the perspective of the entities in WAN 100. Hence, an unlicensed band is a frequency band that is not licensed to an operator of WAN 100. An unlicensed channel is a frequency channel in an unlicensed band.

The availability of several frequency bands that are often not occupied by any primary user has recently led to proposals to allow unlicensed users to use these frequency bands when no primary users are transmitting. In particular, a number of frequency bands within a range of 54 MHz to 698 MHz and covering a total of 282 MHz are proposed for unlicensed use and are collectively referred to as TV white space spectrum. The TV white space spectrum is originally reserved for TV broadcast and includes 47 TV channels each having a 6 MHz bandwidth. Of the 47 TV channels in the TV white space spectrum, only 10 TV channels 21 to 30 from 512 MHz to 572 MHz may be available for use by portable devices in the future. A WAN may use an unlicensed band if the primary users of the band are not interrupted. For example, a cellular network may use an unlicensed band for the access links between base stations and UEs.

In an aspect, an unlicensed spectrum may be used to support P2P communication between UEs in a WAN. P2P communication may offer efficiency and other advantages when UEs are sufficiently close. For example, P2P communication may allow a base station to unload some traffic to P2P links between close-enough UEs, which may then alleviate congestion on the access links between the base station and other UEs. However, if P2P communication shares the same licensed spectrum used for WAN communication, then the effectiveness and capacity of the WAN may be degraded by having to share the available resources among various ongoing WAN communication and P2P communication. Hence, using separate unlicensed spectrum for P2P communication and licensed spectrum for WAN communication may be desirable.

In general, P2P communication may be supported on any unlicensed band. For example, P2P communication may be supported on the TV white space spectrum that includes a number of 6 MHz TV channels. In one design, approximately 5 MHz of a 6 MHz TV channel may be used to support P2P communication (e.g., using LTE, WCDMA, cdma2000, or some other radio technology).

Various schemes may be used to support P2P communication on an unlicensed channel without interfering primary users. These schemes may include the following:
  Location-based scheme—unlicensed channels available for use for P2P communication are determined based on location; and
  Sensing-based scheme—unlicensed channels available for use for P2P communication are determined by sensing the unlicensed channels for primary users and possibly secondary users.
In the location-based scheme, a centralized geolocation database may store unlicensed channels available (or unavailable) for use by secondary users based on geographic locations. For example, a geolocation database for the TV white space spectrum may store active TV channels based on geographic locations and may be used to determine which TV channels (if any) are available for unlicensed use at any particular location. A UE may determine its location based on any positioning method, e.g., Global Positioning System (GPS), triangularization, etc. A base station may determine its location based on any positioning method (e.g., GPS), a hard coded location, etc. The base station or UE may access the geolocation database with it s location in order to determine unlicensed channels that are available for use for P2P communication at its location.

In the sensing-based scheme, a UE may periodically sense an unlicensed channel to detect for primary users and/or secondary users. The UE may communicate on the unlicensed channel when no primary or secondary users are detected and may give up the unlicensed channel if any primary user starts using the unlicensed channel. The sensing-based scheme may also be referred to as "cognitive" operations since the UE is aware of the presence of other users on the unlicensed channel.

Other schemes may also be used to support P2P communication on an unlicensed spectrum. A combination of the schemes (e.g., both the location-based and sensing-based schemes) may also be used to support P2P communication on an unlicensed spectrum.

UEs located outside the coverage of base stations may desire to engage in P2P communication on an unlicensed channel. These UEs may operate on the unlicensed channel based on cognitive operations. In this case, the UEs may periodically sense the unlicensed channel, communicate on the unlicensed channel when no primary users are detected, and immediately give up the unlicensed channel if any primary user starts using the unlicensed channel. Furthermore, the cognitive-capable UEs may periodically access a geolocation database in order to determine whether the unlicensed channel is available for use prior to transmitting on the channel. The additional functions to support P2P communication on the unlicensed channel with cognitive operations may greatly increase the complexity and cost of the UEs.

UEs located within the coverage of the same base station or even different base stations in a WAN may desire to engage in P2P communication on an unlicensed channel. In this case, the WAN may assist in establishing and maintaining P2P communication on an unlicensed channel for these UEs. Network assistance for establishment and maintenance of P2P communication may be especially advantageous for unlicensed channels that may be inherently unreliable.

Network-assisted P2P communication may be supported by UEs having certain capabilities. In one design, UEs may have sensing capabilities and can sense unlicensed channels in order to determine whether these unlicensed channels are open for use. A UE may sense an unlicensed channel to determine whether a primary user and/or a secondary user is using the unlicensed channel. The UE may determine whether a primary user is using the unlicensed channel by processing a received signal to detect a signal transmitted by a primary user on the unlicensed channel. For example, the UE may detect for certain known characteristics (e.g., a chrominance subcarrier) of a signal transmitted on an unlicensed channel in the TV white space spectrum. The UE may also determine whether a secondary user is using the unlicensed channel by measuring the power spectral density (PSD) of interference from the secondary user.

Network-assisted P2P communication may also be supported by base stations having certain capabilities. In one design, the base stations may know their locations with sufficient accuracy and may also have access to a geolocation database providing unlicensed channels available for use for P2P communication based on location. Database access and location may be required to support operation on the TV white space spectrum. If unlicensed channels other than those in the TV white space spectrum are employed, then database access and location may not be needed.

In one design, base stations may also have sensing capabilities even though they may or may not transmit on unlicensed channels. A base station may sense an unlicensed channel to determine whether a primary user and/or a secondary user is using the unlicensed channel. The base station may use the sensing results to determine whether the unlicensed channel can be assigned to P2P communication between UEs under the coverage of the base station. For example, the base station may not assign an unlicensed channel for P2P communication if a primary user and/or a secondary user is detected on the unlicensed channel. Sensing results may be used to improve selection and assignment of unlicensed channels for P2P communication, as described below.

Figure 2:
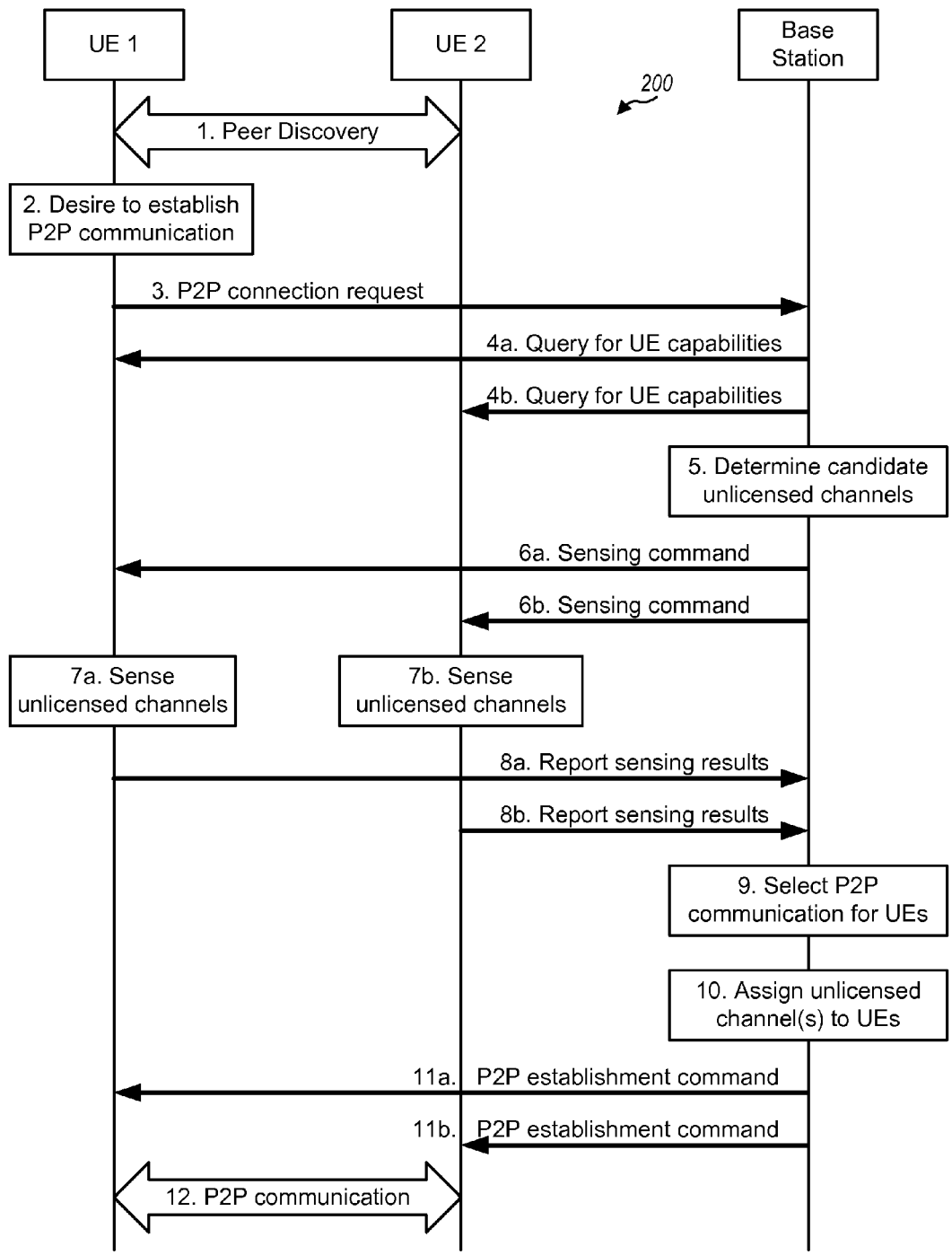
FIG. 2 shows a process for network-assisted P2P communication on an unlicensed spectrum.
Figure 2:
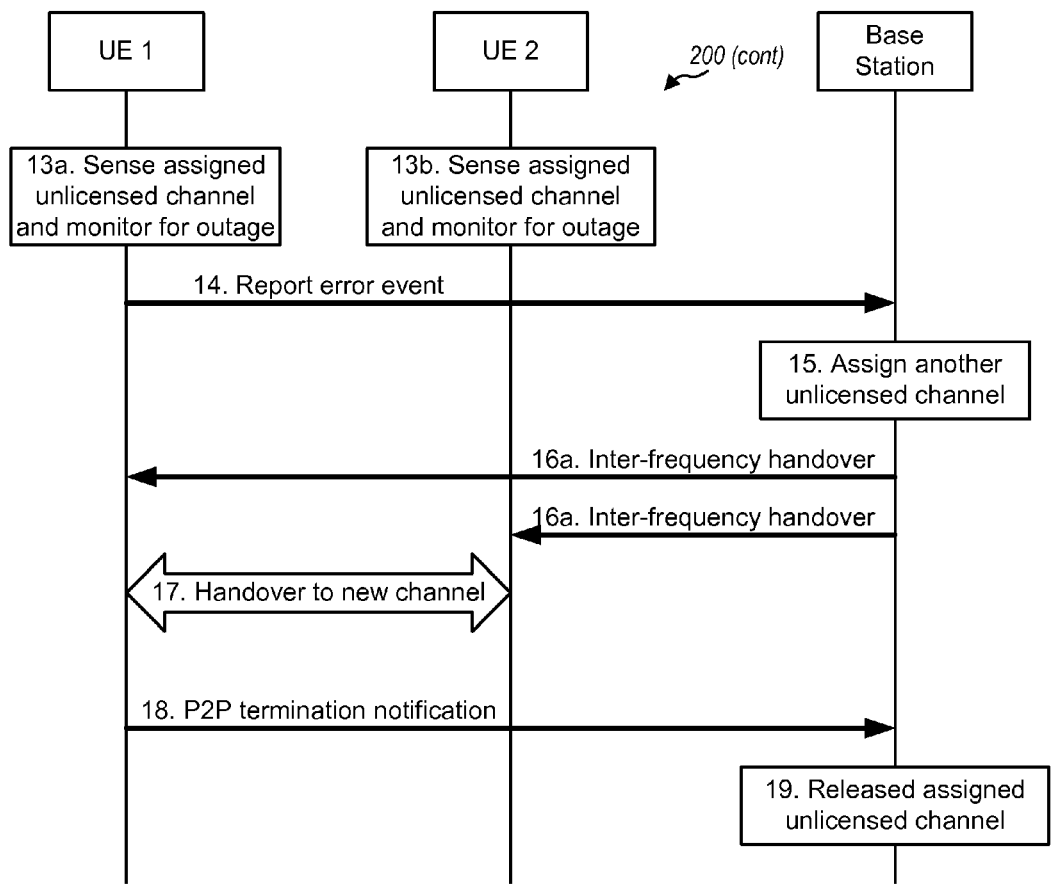

FIG. 2 shows a flow diagram of a design of a process 200 for network-assisted P2P communication on an unlicensed spectrum. For clarity, P2P communication between a group of two UEs is described below. In general, P2P communication may be supported for any number of UEs. In one design, only the P2P server communicates with the WAN for network assistance for P2P communication. The P2P server may then convey pertinent information to the P2P client(s). In another design that is described below, both the P2P server and P2P client(s) may communicate with the WAN for network assistance for P2P communication.

A first UE (UE 1) may detect the presence of a second UE (UE 2) via a peer discovery procedure (step 1). For the peer discovery procedure, each UE (or one designated UE) may (i) transmit a proximity detection signal to announce the presence of that UE and/or (ii) detect proximity detection signals from other UEs. The first UE may desire to establish P2P communication with the second UE (step 2). The first UE may send a P2P connection request to its serving base station to ask for network assistance to establish P2P communication with the second UE (step 3). For example, the P2P connection request may ask for a frequency channel and/or other resources to use for P2P communication.

The base station may query the first and second UEs to determine the capabilities of the UEs involved in P2P communication (steps 4a and 4b). For example, the base station may query whether the UEs support cognitive operations, which unlicensed bands are supported by the UEs, etc. The base station may determine unlicensed channels available for use for P2P communication based on a geolocation database or some other means. In the description herein, an available unlicensed channel is an unlicensed channel that can be used for P2P communication if no primary users are transmitting on the unlicensed channel. The base station may then determine candidate unlicensed channels for possible assignment to the UEs for P2P communication (step 5). The candidate unlicensed channels may be selected from among the available unlicensed channels based on the UE capabilities and/or other criteria. The base station may then issue sensing commands to the UEs for the candidate unlicensed channels (steps 6a and 6b).

The first and second UEs may receive the sensing commands from the base station and may sense the candidate unlicensed channels (steps 7a and 7b). The UEs may report the sensing results and possibly other pertinent information to the base station (steps 8a and 8b). The sensing results may indicate whether a primary user and/or a secondary user was detected on each candidate unlicensed channel, the amount of interference on each candidate unlicensed channel, the channel quality of each candidate unlicensed channel, etc. The pertinent information may include the locations of the UEs, which may be determined based on positioning (e.g., GPS) capabilities of the UEs. The pertinent information may also include the received signal strength, or pathloss, or propagation delay measured by each UE (or one UE) for the other UE, which may be obtained during the peer discovery procedure based on the proximity detection signal received from the other UE. The pertinent information may also include other information that may be useful for establishing P2P communication between the UEs.

The base station may receive the sensing results and possibly other pertinent information from the first and second UEs. The base station may select either P2P communication or WAN communication for the UEs based on the information received from the UEs (step 9). For example, the base station may estimate the distance between the first and second UEs based on their reported locations or the received signal strength, or pathloss, or propagation delay measured by each UE (or one UE) for the other UE. The base station may select P2P communication for the first and second UEs if the estimated distance is less than a threshold (as shown in FIG. 2) or may select WAN communication if the estimated distance is greater than the threshold (not shown in FIG. 2). The base station may also select P2P communication or WAN communication for the UEs based on other factors. For example, the base station may select WAN communication if no unlicensed channels are available for use, or if the UEs are not capable of communicating on the available unlicensed channels, etc.

If P2P communication is selected for the UEs (as shown in FIG. 2), then the base station may select an unlicensed channel for P2P communication, e.g., based on the sensing results and/or other information available to the base station (step 10). The base station may then assign the selected unlicensed channel to the UEs for P2P communication (also step 10). The base station may instruct the first and second UEs to establish P2P communication and may also provide the assigned unlicensed channel (steps 11a and 11b). The first and second UEs may receive the instructions from the base station and may establish P2P communication on the assigned unlicensed channel (step 12). The UEs may then communicate peer-to-peer on the assigned unlicensed channel (also step 12).

If WAN communication is selected for the UEs (not shown in FIG. 2), then the base station may instruct the UEs to establish WAN communication via the base station. The base station may also determine that P2P communication can be supported only on a licensed channel. The base station may then assigned some resources of the licensed channel and may instruct the first and second UEs to establish P2P communication on the assigned resources of the licensed channel.

Communication on unlicensed channels may be inherently unreliable, since these channels may be legally jammed by primary users or even secondary users at any time. For example, different radio technologies may be cognitive-capable and may decide to use the same unlicensed channel, which may result in jamming between the unlicensed users of different radio technologies. Therefore, unlicensed channels may be subject to outage periods during which communication is not possible on these unlicensed channels due to excessive interference. Suitable techniques may be used to recognize such outages and perform handovers to different channels.

In one design, the first UE and/or second UE involved in P2P communication may continually monitor for outage while P2P communication is active on the assigned unlicensed channel (steps 13a and 13b). The first UE and/or second UE may detect outage when channel quality of the assigned unlicensed channel is below a certain minimum channel quality threshold, when the interference power on the unlicensed channel exceeds a certain interference threshold, when channel quality indicator (CQI) drops below a certain CQI threshold, when the dynamic behavior of CQI (e.g., quick drops which cannot be due to fading only) suggests abnormal conditions, when a data error rate of P2P communication exceeds a certain maximum data error rate threshold, etc. Outage monitoring may be helpful since communication on the unlicensed channel may be inherently unreliable for the reasons mentioned above.

Alternatively or additionally, the first UE and/or second UE may periodically sense the assigned unlicensed channel for primary and/or secondary users (also steps 13a and 13b). For example, the first UE and/or second UE may detect the presence of a secondary user on the assigned unlicensed channel based on a higher interference level on the P2P link, which may be due to the secondary user starting transmission on the same unlicensed channel. The higher interference level may be recognized through a sudden degradation of the CQI for the P2P link or a higher rate of negative acknowledgement (NACK), etc.

The first UE and/or second UE may detect an error event, which may be due to outage being detected, or a primary user being sensed on the assigned unlicensed channel, or strong interference being detected on the assigned unlicensed channel, etc. The first UE and/or second UE may report the error event to the base station (step 14). In response to the reported error event, the base station may assign another unlicensed channel to the first and second UEs for P2P communication (step 15). The base station may then send an inter-frequency handover command with the newly assigned unlicensed channel to the first and second UEs (steps 16a and 16b). The UEs may then switch frequency and communicate peer-to-peer on the newly assigned unlicensed channel (step 17). The dynamic frequency channel selection described above in steps 13 to 17 may be performed again using the updated status.

When P2P communication is completed, the first UE and/or second UE may send a P2P termination notification to the base station (step 18). The base station may release the unlicensed channel assigned to the UEs so that it can be assigned to other UEs for P2P communication (step 19). Some of the steps of process 200 are described in further detail below.

In one design, a base station may employ a timeout procedure to detect dead P2P links. The base station may start a timer when the assigned unlicensed channel is sent to the first and second UEs in steps 11a and 11b in FIG. 2. The base station may release the assigned unlicensed channel when the timer expires, even if a P2P termination notification is not received from the UEs. The UEs may not send a P2P termination notification for various reasons such as a sudden lack of coverage for the uplink to the base station. The timeout procedure may allow the base station to reclaim unlicensed channels assigned to dead P2P links.

A base station may select an unlicensed channel to assign to a group of UEs for P2P communication (e.g., in step 9 in FIG. 2) based on various criteria. The selected unlicensed channel should comply with applicable regulations and should not be a channel on which primary users are detected. The selected unlicensed channel should not have excessive interference from secondary users using the channel. The selected unlicensed channel should have acceptable channel quality for the P2P link between the UEs. The channel quality may be dependent on pathloss and shadowing, which may in turn be dependent on the center frequency of the selected unlicensed channel. The selected unlicensed channel should be supported by the capabilities of the UEs, e.g., should be among the unlicensed channels supported by the UEs. The selected unlicensed channel may also be assigned to the UEs if they support communication on a licensed channel (for the access links between the UEs and the base station) and the unlicensed channel (for P2P link between the UEs) at the same time. The selected unlicensed channel should also avoid excessive interference among different ongoing P2P links under the coverage of the base station. In particular, the base station may avoid assigning the same unlicensed channel to different groups of UEs for P2P communications if these groups of UEs are close enough to interfere with one another. The base station may also select an unlicensed channel to assign to a group UEs for P2P communication based on other criteria. In general, the base station may select the best available unlicensed channel to assign to each group of UEs such that good performance can be achieved for P2P communication for all UEs.

In one design, a base station may periodically monitor one or more unlicensed channels regardless of whether or not P2P connection requests have been received from UEs. The base station may also request its UEs to monitor their assigned unlicensed channels and/or other unlicensed channels and to report the monitoring results to the base station. The base station and the UEs are typically at different locations and may thus have different monitoring results. The base station may update its list of available unlicensed channels based on its monitoring results and/or the monitoring results reported by the UEs. If an unlicensed channel assigned to a group of UEs for P2P communication is deemed to be occupied by primary and/or secondary users, then the base station may assign a new unlicensed channel in the list to the group of UEs for P2P communication.

In one design, a base station may maintain a list of active P2P links under its coverage. The base station may also store the unlicensed channel assigned to each P2P link, the location of each P2P link, etc. The base station may use the list of active P2P links and the associated assigned unlicensed channels and locations (if available) to ensure that different P2P links do not interfere one another. The base station may receive interference estimates periodically reported by UEs in the various P2P links and may select an unlicensed channel to assign to each P2P link by considering the interference estimates.

For network-assisted P2P communication, the UEs may communicate with their serving base stations to establish and maintain P2P communication, e.g., as described above in FIG. 2. Communication between the UEs and their serving base stations may be supported in various manners. In one design, a UE may communicate with its serving base station on a licensed channel and with other UE(s) on an unlicensed channel. If the UE is equipped with a single transceiver comprising one transmitter and one receiver, then the UE may periodically interrupt P2P communication, tune its transceiver to the licensed channel, communicate with its serving base station for necessary functions (e.g., to report sensing results, error events, etc.), retune its transceiver back to the unlicensed channel, and resume P2P communication. P2P communication and WAN communication may thus be time division multiplexed, and the UE may have a discontinuous reception (DRX) pattern indicating time intervals during which the UE will communicate with its serving base station. If the UE is equipped with two transceivers, then the UE may use one transceiver for communication with the serving base station on the licensed channel and the other transceiver for communication with the other UE(s) on the unlicensed channel. This would allow the UE to engage in P2P communication and at the same time to actively exchange (e.g., transmit and/or receive) data and/or control signaling with the serving base station.

A potentially long outage period may occur when an unlicensed channel assigned to a group of UEs for P2P communication becomes unusable. The long outage period may be due to the amount of time spent by the UEs to detect the outage, inform a serving base station, and wait for the base station to send a newly assigned unlicensed channel to the UEs for use for P2P communication.

In another aspect, a base station may provide a list of unlicensed channels (instead of a single unlicensed channel) that may be used by a group of UEs for P2P communication. The number of unlicensed channels to include in the list may be dependent on various factors such as the number of P2P links currently supported by the base station, the number of unlicensed channels with sufficient quality that do not interfere with primary users or other P2P links, the data requirements and/or priority of the UEs, etc. The UEs may initially use one unlicensed channel in the list for P2P communication. If the employed unlicensed channel becomes unavailable for whatever reason, then the UEs may automatically switch to another unlicensed channel in the list, without having to report an error event to the base station and wait for another unlicensed channel to be assigned by the base station. The assignment of the list of unlicensed channels may thus reduce outage periods because the UEs can quickly switch to another unlicensed channel.

In one design, the list of unlicensed channels may include the initially assigned unlicensed channel and one or more backup unlicensed channels. In this design, the UEs may use the initially assigned unlicensed channel for P2P communication and may switch to one of the backup unlicensed channels when the initially assigned unlicensed channel becomes unavailable. In another design, the list may include unlicensed channels that can be used for P2P communication by the UEs. The UEs may then use any one of the unlicensed channels in the list for P2P communication.

In one design, the list of unlicensed channels may be sorted in an order of preference, e.g., starting with the most preferred unlicensed channel and ending with the least preferred unlicensed channel. In this design, the most preferred (e.g., the first or next) unlicensed channel in the list may be selected for use when the currently employed unlicensed channel becomes unavailable. In another design, the list may be un-assorted, and the unlicensed channels in the list may be evaluated to determine the best unlicensed channel that is open for use from among those in the list.

In one design, a UE may inform its serving base station of a switch to a backup unlicensed channel. The base station may then assign an unlicensed channel to the UE for P2P communication and/or may send a new list of unlicensed channels to the UE. The UE may switch to a newly assigned unlicensed channel (if provided by the base station) and may use the new list of unlicensed channels (if and when necessary).

In one design, a UE may notify its serving base station when all unlicensed channels in the list are unavailable for use for P2P communication. In this case, the serving base station may assign a new unlicensed channel (if available) and may inform all UEs involved in P2P communication of the newly assigned unlicensed channel. The UEs may then perform handover to the newly assigned unlicensed channel. Alternatively, the base station may select WAN communication for the UE and may inform all involved UEs of the switch from P2P communication to WAN communication.

Much of the description above (e.g., the process shown in FIG. 2) assumes that all UEs involved in P2P communication have the same serving base station. This base station may make all decisions regarding which unlicensed channels to sense and which unlicensed channel to use for P2P communication by the UEs.

In yet another aspect, a set of base stations may cooperate to support P2P communication for UEs under the coverage of these base stations. Cooperation among base stations may be useful in order to avoid interference among active P2P links that are under the coverage of different base stations but are close enough to interfere with one another. Cooperation among base stations may also be useful to support P2P communication among UEs under the coverage of different base stations (e.g., UEs 120e and 120f in FIG. 1).

In one design, a set of base stations may cooperate to determine a suitable frequency plan of unlicensed channels to be used by all UEs engage in P2P communication under the coverage of these base stations. This frequency plan may be given in various formats. In one design, the frequency plan may include a set of unlicensed channels for each base station. Each base station may assign unlicensed channels in its set to its UEs for P2P communication, e.g., assigned one unlicensed channel or one list of unlicensed channels to each P2P group. For a group of UEs located under the coverage of different base stations, an unlicensed channel or a list of unlicensed channels may be assigned to the group of UEs by a serving base station of a UE that is designated as a P2P server for the group of UEs.

Different base stations may have overlapping or non-overlapping sets of unlicensed channels, depending on the interference between different P2P links. For example, the same unlicensed channel may be used for (i) P2P communication between UEs 120c and 120d under the coverage of base station 110b in FIG. 1 and (ii) P2P communication between UEs 120g, 120h and 120i under the coverage of base station 110c, since these two sets of UEs are sufficiently far part and minimally interfere with one another. This same unlicensed channel may then be included in the two sets of unlicensed channels for base stations 110b and 110c.

The frequency plan for the set of base stations may be determined based on the criteria described above for the case of a single base station. The frequency plan may also be determined by taking into account ongoing P2P communication by different groups of UEs under the coverage of neighboring base stations (or the P2P loads of neighboring base stations). The frequency plan may be determined in various manners.

In one design, distributed dynamic frequency selection may be employed, and the set of base stations may communicate (e.g., via the backhaul) to jointly determine the frequency plan. In one design, the distributed dynamic frequency selection may be based on a message-passing scheme. In this scheme, each base station may send messages (e.g., periodically or when triggered by certain events) to one or more neighbor base stations (e.g., via the backhaul). The messages may include pertinent information such as the unlicensed channels currently used by P2P links under its coverage, sensing results from UEs under its coverage, UE capabilities, new P2P communication requests (e.g., from UEs belonging to different base stations), UE priorities, etc. Each base station may determine a set of unlicensed channels that is not occupied by primary and secondary users. Each base station may also determine unlicensed channels that are used by P2P links under the coverage of neighbor base stations and hence may be unavailable for assignment to some or all UEs under the coverage of that base station for P2P communication. Each base station may then determine (i) a set of unlicensed channels that can be assigned to its UEs for P2P communication and (ii) possibly the area within which each unlicensed channel can be assigned. Each base station may also determine its set of unlicensed channels in other manners.

Messages may be exchanged at a relatively infrequently rate between the base stations due to the large time scale of cognitive operations, e.g., on the order of hundreds of milliseconds (ms). Messages may be exchanged even less frequently if each P2P link is provided with at least one backup unlicensed channel. In this case, even if an unlicensed channel initially assigned to a given P2P link suddenly becomes unavailable, a backup unlicensed channel may be used until the distributed algorithm comes up with a new assignment of a more optimized unlicensed channel that may provide better performance.

In another design, centralized frequency selection may be employed, and a designated network entity (e.g., a base station or a network controller) may receive pertinent information from a set of base stations and determine a frequency plan for these base stations. Each base station may send messages (e.g., periodically or when triggered by certain events) to the designated network entity. The messages may include pertinent information, e.g., as described above. The designated network entity may determine a set of unlicensed channels for each base station based on the pertinent information received from all base stations.

Cooperation between base stations to support P2P communication may be triggered based on various conditions. In one design, such cooperation may be triggered when two or more P2P links under the coverage of different base station interfere one of each other. In another design, such cooperation may be triggered when two or more UEs associated with different base stations desire to establish P2P communication. The set of base stations that should cooperate may be determined based on measurements reported by the UEs, association of the UEs, etc.

In yet another aspect, P2P communication may be supported on an unlicensed channel as well as a licensed channel. The use of both licensed and unlicensed channels for P2P communication may be referred to as carrier aggregation. In one design, some resources of the licensed channel may be assigned for P2P communication and may include some resource blocks for the uplink and/or other resources. The resources assigned for P2P communication may be interleaved in time with regular uplink transmissions for WAN communication.

Both licensed and unlicensed channels may be used for P2P communication in various manners. The unlicensed channel may provide high data transmission capacity with unpredictable reliability whereas the licensed channel may provide low data transmission capacity with high reliability. In one design, signaling may be sent on the licensed channel having better reliability, and data may be sent on the unlicensed channel having higher capacity. In another design, higher priority data and signaling may be sent on the licensed channel and the remaining data may be sent on the unlicensed channel. In yet another design, data and signaling may be sent on the unlicensed channel unless poor performance or outage is detected and may then be sent on the licensed channel. The licensed and unlicensed channels may also be used for P2P communication in other manners.

The use of both licensed and unlicensed channels for P2P communication may provide various advantages. First, improved reliability may be obtained by using some resources of the licensed channel for P2P communication. Second, latency may be reduced when the unlicensed channel becomes unusable. In such a scenario, P2P communication may be maintained on the assigned resources of the licensed channel. Service outage may be avoided for P2P communication even with the loss of the unlicensed channel, and only a drop in throughput performance may be witnessed by the UEs until a new unlicensed channel is assigned to the UEs.

In yet another aspect, a base station may transmit dummy signals on one or more reserved unlicensed channels. A reserved unlicensed channel is an unlicensed channel that is not used by any primary users and is not yet assigned for P2P communication. The dummy signals may resemble (e.g., may have key characteristics of) the signals typically transmit on the unlicensed channels. For example, the dummy signals may comprise a single-carrier signal that is applied with random modulation at a suitable rate. The dummy signals may be used to occupy the reserved unlicensed channels and chase away other devices of other radio technologies from the unlicensed channels. When a P2P connection request is received from a UE, the base station may select one reserved unlicensed channel for assignment to the UE for P2P communication and may stop transmitting a dummy signal on the selected unlicensed channel.

Figure 3:
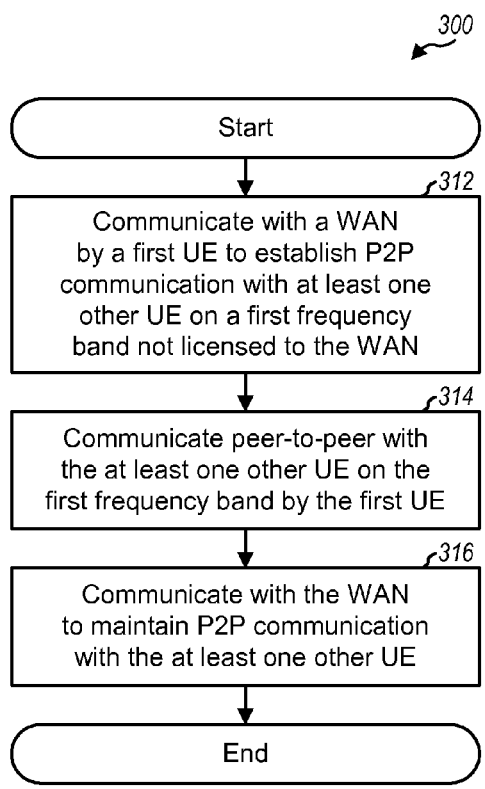
FIG. 3 shows a process for communicating peer-to-peer on an unlicensed spectrum with network assistance.

FIG. 3 shows a design of a process 300 for communicating peer-to-peer on an unlicensed spectrum with network assistance. Process 300 may be performed by a first UE (as described below) or by some other entity. The first UE may communicate with a WAN (e.g., a serving base station) to establish P2P communication with at least one other UE on a first frequency band that is not licensed to the WAN (block 312). The first frequency band may correspond to a TV white space spectrum or some other frequency band. The first UE may thereafter communicate peer-to-peer with the at least one other UE on the first frequency band (block 314). The first UE may also communicate with the WAN to maintain P2P communication with the at least one other UE (block 316). The first UE may communicate with the WAN on a second frequency band on which the WAN is licensed. The first UE may thus communicate with the WAN and the other UE(s) on different licensed and unlicensed frequency bands.

In one design of block 312, the first UE may send a request for P2P communication (e.g., a P2P connection request) to the WAN. The first UE may thereafter receive at least one frequency channel in the first frequency band to use for P2P communication. In one design, the first UE may sense one or more frequency channels in the first frequency band to detect usage of the one or more frequency channels by licensed and/or unlicensed users of the first frequency band. The one or more frequency channels to sense by the first UE may be received from the WAN (e.g., as shown in FIG. 2) or may be determined by the first UE. The first UE may send sensing results to the WAN. The at least one frequency channel assigned to the first UE for P2P communication may be selected based on the sensing results.

In one design, the first UE may receive from the WAN a list of frequency channels in the first frequency band that is available for use for P2P communication by the first UE. The first UE may communicate peer-to-peer with the at least one other UE on a first frequency channel in the list. The first UE may detect performance degradation on the first frequency channel or usage of the first frequency channel by at least one licensed user of the first frequency band. The first UE may then perform handover from the first frequency channel to a second frequency channel in the list. The first UE may send to the WAN an indication of the handover from the first frequency channel to the second frequency channel. The first UE may thereafter receive from the WAN an updated list of frequency channels in the first frequency band and available for use for P2P communication by the first UE.

In one design, the first UE may detect P2P communication failure on the first frequency band and may send a notification of P2P communication failure to the WAN. In one design, the first UE may receive an indication to terminate P2P communication from the WAN and may terminate P2P communication in response to the received indication. In another design, the first UE may switch from P2P communication to WAN communication in response to detecting P2P communication failure. In yet another design, the first UE may receive an indication to continue P2P communication on the second frequency band and may then continue P2P communication on the second frequency band in response to the received indication.

In one design, the first UE may communicate peer-to-peer with the at least one other UE also on the second frequency band, e.g., as described above for carrier aggregation. P2P communication on the second frequency band may be more reliable but may have lower capacity than P2P communication on the first frequency band. The lower capacity for P2P communication on the second frequency band may be mainly due to the second frequency band being shared between P2P links and access links, e.g., through subframe or subband partitioning.

Figure 4:
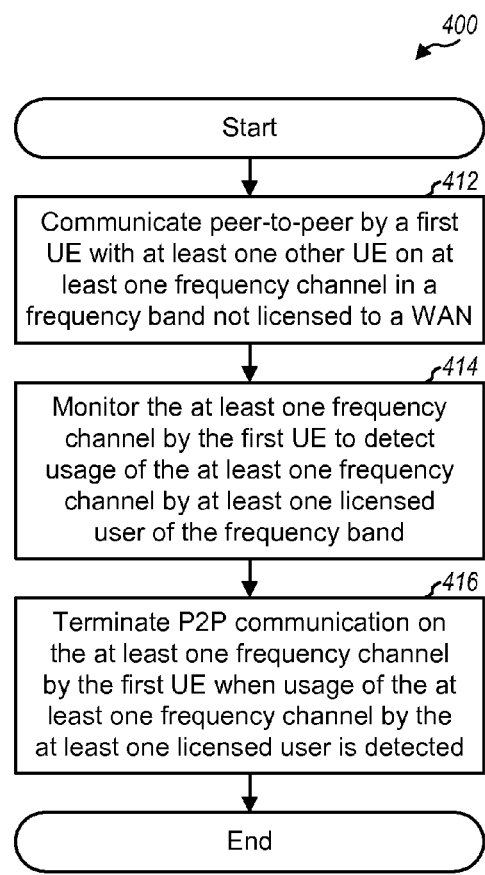
FIG. 4 shows a process for communicating peer-to-peer on an unlicensed spectrum with sensing.

FIG. 4 shows a design of a process 400 for communicating peer-to-peer on an unlicensed spectrum with sensing. Process 400 may be performed by a first UE (as described below) or by some other entity. The first UE may communicate peer-to-peer with at least one other UE on at least one frequency channel in a frequency band that is not licensed to a WAN (block 412). The first UE may monitor the at least one frequency channel to detect usage of the at least one frequency channel by at least one licensed user of the frequency band (block 414). The first UE may terminate P2P communication on the at least one frequency channel when usage of the at least one frequency channel by the at least one licensed user is detected (block 416). The first UE may also terminate P2P communication on the at least one frequency channel when unlicensed users and/or poor performance is detected.

In one design, prior to establishing P2P communication on the frequency band, the first UE may sense one or more frequency channels in the frequency band to detect usage of the one or more frequency channels. The first UE may send sensing results to the WAN. The at least one frequency channel assigned to the first UE for P2P communication may be selected based on the sensing results from the first UE as well as other information.

In one design of block 414, the first UE may sense at least one characteristic of at least one signal transmitted by at least one licensed user of the frequency band to detect usage of the at least one frequency channel by the at least one licensed user. The first UE may periodically sense the at least one frequency channel (e.g., in each time interval of a particular duration) while P2P communication is active.

In one design, the first UE may perform handover from the at least one frequency channel to at least one other frequency channel in the frequency band when usage of the at least one frequency channel by licensed and/or unlicensed users is detected. In another design, the first UE may switch from P2P communication to WAN communication when usage of the at least one frequency channel is detected. In yet another design, the first UE may detect performance degradation (e.g., outage) on the at least one frequency channel and may then (i) perform handover from the at least one frequency channel to at least one other frequency channel or (ii) switch from P2P communication to WAN communication.

Figure 5:
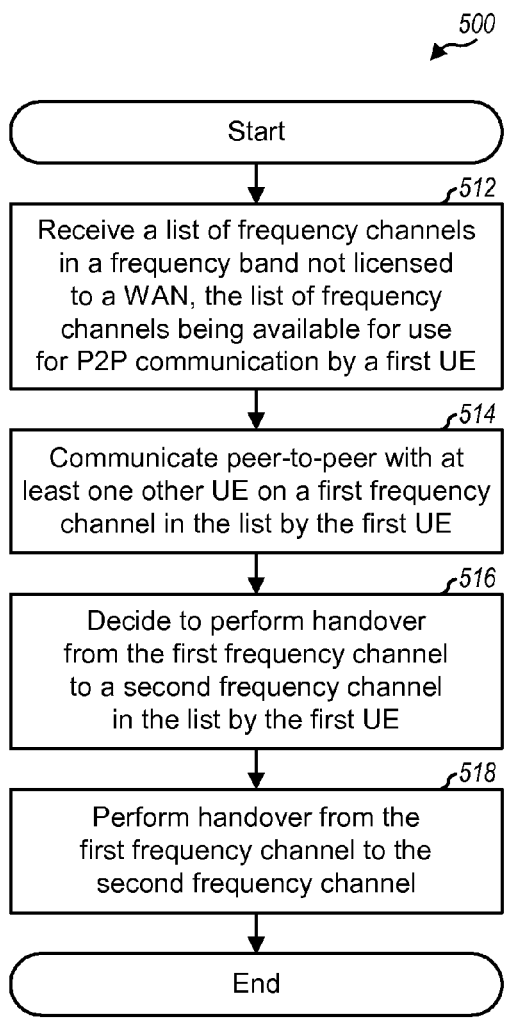
FIG. 5 shows a process for communicating peer-to-peer on an unlicensed spectrum with a list of frequency channels.

FIG. 5 shows a design of a process 500 for communicating peer-to-peer on an unlicensed spectrum. Process 500 may be performed by a first UE (as described below) or by some other entity. The first UE may receive a list of frequency channels in a frequency band that is not licensed to a WAN, with the list of frequency channels being available for use for P2P communication by the first UE (block 512). The first UE may communicate peer-to-peer with at least one other UE on a first frequency channel in the list (block 514). The first UE may decide to perform handover from the first frequency channel to a second frequency channel in the list (block 516). The first UE may then perform handover from the first frequency channel to the second frequency channel (block 518) and may thereafter communicate peer-to-peer with the at least one other UE on the second frequency channel.

In one design of block 516, the first UE may detect usage of the first frequency channel by at least one licensed user of the frequency band and may decide to perform handover in response to detecting such usage. In another design, the first UE may detect strong interference on the first frequency channel from at least one unlicensed user of the frequency band and may decide to perform handover in response to detecting strong interference. In yet another design, the first UE may detect performance degradation (e.g., outage) on the first frequency channel and may decide to perform handover in response to detecting performance degradation. The first UE may also decide to perform handover due to other reasons.

In one design, the list may include a plurality of frequency channels sorted in an order of preference. The first and second frequency channels may then be selected based on the order of preference. In another design, the first UE may evaluate each available frequency channel in the list and may select the second frequency channel due to better performance (e.g., better channel quality).

The first UE may determine that no frequency channel in the list is available for use for P2P communication and may send a notification of no available frequency channel to the WAN. In one design, the first UE may then receive from the WAN a new list of frequency channels, in the frequency band, available for use for P2P communication. The first UE may then switch to a frequency channel in the new list for P2P communication. In another design, the first UE may receive an indication to switch from P2P communication to WAN communication and may then switch to WAN communication in response to the indication. In yet another design, the first UE may receive from the WAN an assignment of some resources on a licensed frequency band for the WAN and may continue P2P communication on these resources.

Figure 6:
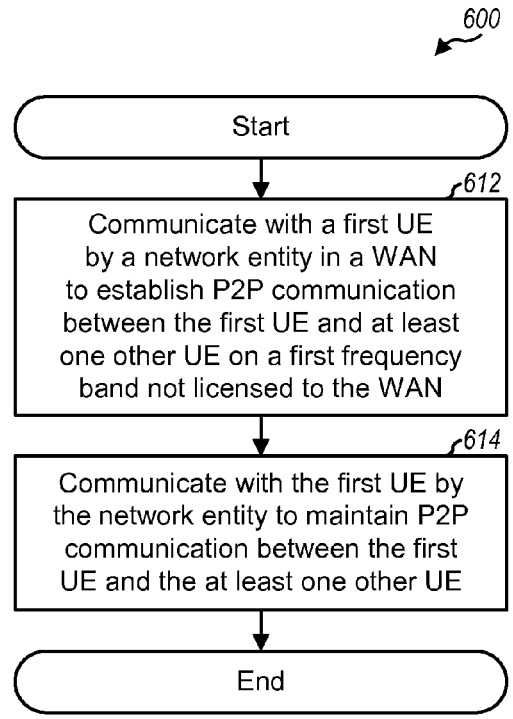
FIG. 6 shows a process for supporting P2P communication on an unlicensed spectrum by a network entity.

FIG. 6 shows a design of a process 600 for supporting P2P communication on an unlicensed spectrum with network assistance. Process 600 may be performed by a network entity in a WAN (as described below) or by some other entity. The network entity may communicate with a first UE to establish P2P communication between the first UE and at least one other UE on a first frequency band that is not licensed to the WAN (block 612). The network entity may also communicate with the first UE to maintain P2P communication between the first UE and the at least one other UE (block 614). The network entity may be a serving base station of the first UE or some other entity. The network entity may communicate with the first UE on a second frequency band on which the WAN is licensed.

In one design of block 612, the network entity may receive a request for P2P communication from the first UE. The network entity may select at least one frequency channel to assign to the first UE for P2P communication from among frequency channels in the first frequency band that are not used by licensed users of the first frequency band. The at least one frequency channel may be selected based on various factors such as interference from unlicensed users of the first frequency band, or interference from other UEs assigned the at least one frequency channel for P2P communication, or channel quality of the at least one frequency channel estimated by the first UE, or capabilities of the first UE, or a combination thereof. The network entity may send the at least one frequency channel to the first UE for use for P2P communication.

In one design, the network entity may receive sensing results for one or more frequency channels in the first frequency band from the first UE (and possibly the at least one other UE). The one or more frequency channels may be determined by the network entity and sent to the first UE in a set of frequency channels to be sensed by the first UE. The one or more frequency channels may also be determined by the first UE. The network entity may select the at least one frequency channel to assign to the first UE for P2P communication based on the sensing results from the first UE.

In one design, the network entity may send a first list of frequency channels in the first frequency band and available for P2P communication by the first UE. The first UE may communicate peer-to-peer with the at least one other UE on a first frequency channel in the first list. The network entity may receive from the first UE an indication of handover from the first frequency channel to a second frequency channel in the first list. The network entity may then send a second list of frequency channels in the first frequency band and available for use for P2P communication by the first UE.

In one design, the network entity may determine a set of frequency channels in the first frequency band and available for P2P communication based on the location of the first UE, or the location of the network entity, or both. For example, the network entity may determine the set of frequency channels based on a geolocation database containing frequency channels in the first frequency band and available for unlicensed use at different locations. The network entity may select at least one frequency channel to assign to the first UE for P2P communication based on the set of frequency channels available for P2P communication. In one design, the network entity may update the set of frequency channels in the first frequency band and available for P2P communication, e.g., based on interference estimates from UEs under its coverage and communicating peer-to-peer.

In one design, the network entity may maintain a list of P2P links under its coverage, with each P2P link corresponding to a group of UEs communicating peer-to-peer. The network entity may also maintain a list of frequency channels in the first frequency band and used for the list of P2P links. The network entity may select at least one frequency channel in the first frequency band to assign to the first UE for P2P communication based on the list of frequency channels used for the list of P2P links and the available frequency channels in the first frequency band.

In one design, for carrier aggregation, the network entity may assign resources in a second frequency band, on which the WAN is licensed, to the first UE for P2P communication. P2P communication on the assigned resources in the second frequency band may be more reliable but may have lower capacity than P2P communication on the first frequency band.

The network entity may receive an indication of P2P communication failure from the first UE. In one design, the network entity may send at least one other frequency channel in the first frequency band for use for P2P communication by the first UE. In another design, the network entity may switch the first UE to WAN communication. In yet another design, the network entity may send an indication to continue P2P communication on the second frequency band on which the WAN is licensed. In yet another design, the network entity may send an indication to terminate P2P communication. The network entity may also address P2P communication failure in other manners.

In one design, the network entity may determine one or more frequency channels in the first frequency band and not assigned for P2P communication. The network entity may transmit one or more dummy signals on the one or more frequency channels to discourage use of the one or more frequency channels by unlicensed users of the first frequency band.

Figure 7:
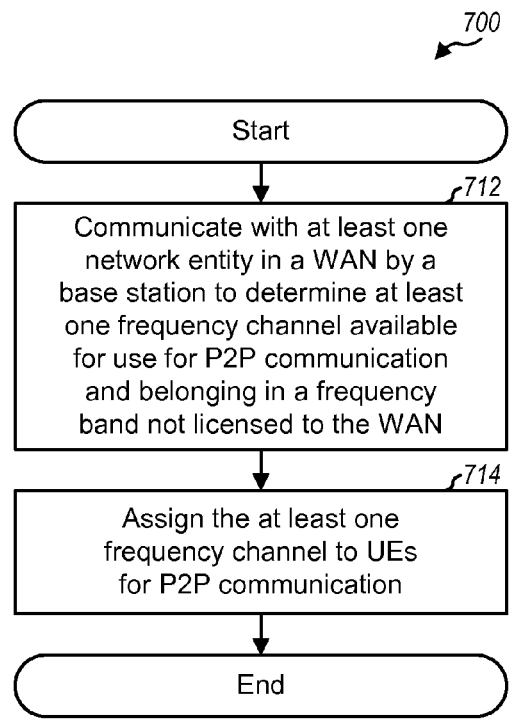
FIG. 7 shows a process for supporting P2P communication on an unlicensed spectrum with cooperation between network entities.

FIG. 7 shows a design of a process 700 for supporting P2P communication on an unlicensed spectrum with cooperation between network entities. Process 700 may be performed by a base station (as described below) or by some other entity. The base station may communicate with at least one network entity in a WAN to determine at least one frequency channel available for use for P2P communication (block 712). The at least one frequency channel may belong in a frequency band that is not licensed to the WAN. The base station may assign the at least one frequency channel to its UEs for P2P communication (block 714).

In one design of block 712, the base station may exchange P2P related information with the at least one network entity. The P2P related information may comprise frequency channels in the frequency band that have been assigned for P2P communication, or frequency channels in the frequency band that are available for P2P communication, or requests for P2P communication, or capabilities and/or priorities of UEs requesting P2P communication, or a combination thereof.

For a distributed scheme, the at least one network entity may comprise at least one neighbor base station cooperating with the base station to (i) mitigate interference between a plurality of P2P links under the coverage of these base stations and/or (ii) establish P2P communication for a plurality of groups of UEs associated with these base stations. The neighbor base station(s) may be determined based on measurements reported by UEs, associations of UEs, and/or other information. The base station may send P2P related information to the neighbor base station(s) and may receive P2P related information from the neighbor base station(s). The base station may determine at least one frequency channel to assign to its UEs for P2P communication based on the P2P related information.

For a centralized scheme, the at least one network entity may comprise a designated network entity, which may be a base station or a network controller. The base station may send P2P related information to the designated network entity and may receive at least one frequency channel to assign to its UEs for P2P communication. The at least one frequency channel may be determined by the designated network entity based on P2P related information received from the base station and the neighbor base station(s).

Figure 8:
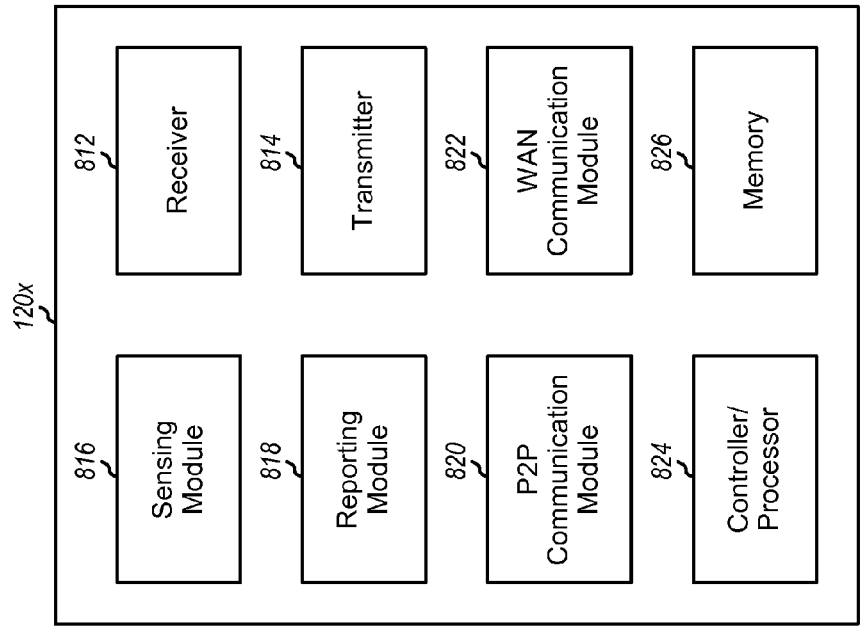
FIG. 8 shows a block diagram of a UE capable of P2P communication.

FIG. 8 shows a block diagram of a design of a UE 120x capable of P2P communication. Within UE 120x, a receiver 812 may receive P2P signals transmitted by other UEs for P2P communication and may receive downlink signals transmitted by base stations for WAN communication. A transmitter 814 may transmit P2P signals to other UEs for P2P communication and may transmit uplink signals to base stations for WAN communication. A module 816 may sense frequency channels in unlicensed frequency bands and may provide sensing results. A module 818 may report sensing results and detected outage and may send indication of P2P communication failure. A module 820 may support P2P communication, e.g., generate and process signals used for P2P communication. A module 822 may support WAN communication, e.g., generate and process signals used for WAN communication. The various modules within UE 120x may operate as described above. A controller/processor 824 may direct the operation of various modules within UE 120x. A memory 826 may store data and program codes for UE 120x.

Figure 9:
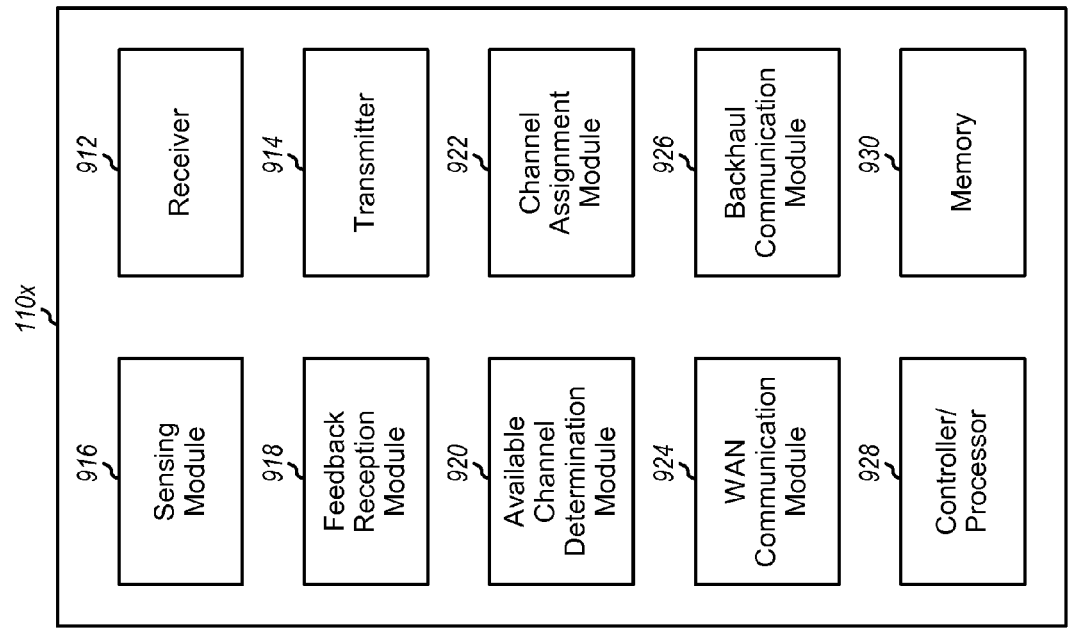
FIG. 9 shows a block diagram of a base station supporting P2P communication.

FIG. 9 shows a block diagram of a design of a base station 110x supporting P2P communication. Within base station 110x, a receiver 912 may receive uplink signals transmitted by UEs for WAN communication. A transmitter 914 may transmit downlink signals to UEs for WAN communication. A module 916 may sense frequency channels in unlicensed frequency bands and provide sensing results. A module 918 may receive sensing results, requests for P2P communication from UEs, indications of P2P communication failure from UEs, and/or other signaling from UEs. A module 920 may determine frequency channels in unlicensed band(s) and available for P2P communication, e.g., based on queries to a geolocation database. A module 922 may assign frequency channels in the unlicensed band(s) to UEs for P2P communication, e.g., as described above. A module 924 may support WAN communication for UEs, e.g., generate and process signals used for WAN communication. A module 926 may support communication with other network entities (e.g., base stations) via the backhaul, e.g., for cooperation to support P2P communication for UEs. The various modules within base station 110x may operate as described above. A controller/processor 928 may direct the operation of various modules within base station 110x. A memory 930 may store data and program codes for base station 110x.

The modules within UE 120x in FIG. 8 and the modules within base station 110x in FIG. 9 may comprise processors, electronic devices, hardware devices, electronic components, logical circuits, memories, software codes, firmware codes, etc., or any combination thereof.

Figure 10:
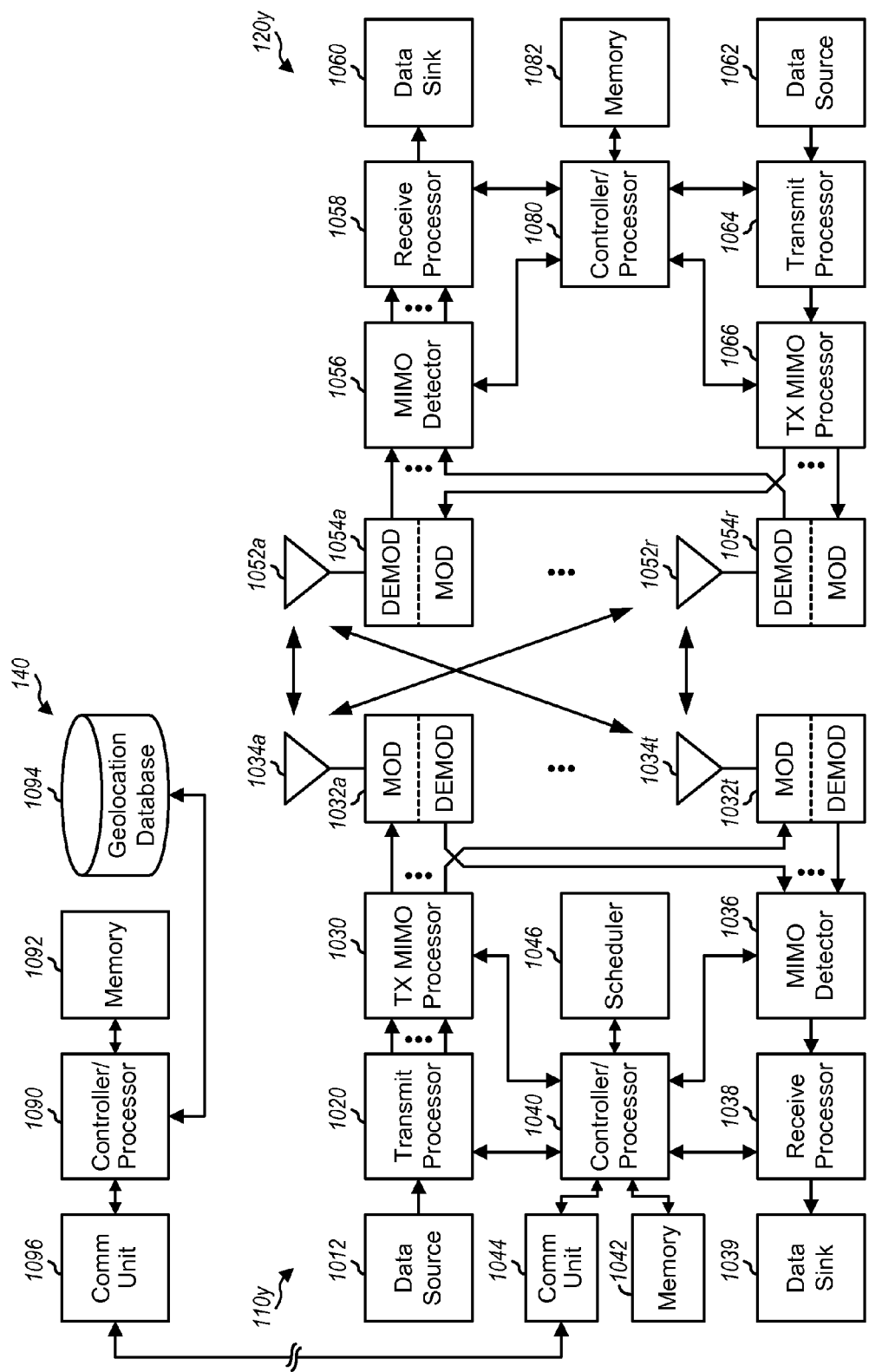
FIG. 10 shows another block diagram of a base station and a UE.

FIG. 10 shows a block diagram of a design of a base station 110y and a UE 120y, which may be one of the base stations and one of the UEs in FIG. 1. Base station 110y may be equipped with T antennas 1034a through 1034t, and UE 120y may be equipped with R antennas 1052a through 1052r, where in general T≥1 and R≥1.

At base station 110y, a transmit processor 1020 may receive data for one or more UEs from a data source 1012 and control information (e.g., messages supporting P2P communication and WAN communication) from a controller/processor 1040. Processor 1020 may process (e.g., encode and modulate) the data and control information to obtain data symbols and control symbols, respectively. Processor 1020 may also generate reference symbols for synchronization signals, reference signals, etc. A transmit (TX) multiple-input multiple-output (MIMO) processor 1030 may perform spatial processing (e.g., precoding) on the data symbols, the control symbols, and/or the reference symbols, if applicable, and may provide T output symbol streams to T modulators (MODs) 1032a through 1032t. Each modulator 1032 may process a respective output symbol stream (e.g., for OFDM, etc.) to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At UE 120y, antennas 1052a through 1052r may receive the downlink signals from base station 110y, downlink signals from other base stations, and/or P2P signals from other UEs and may provide received signals to demodulators (DEMODs) 1054a through 1054r, respectively. Each demodulator 1054 may condition (e.g., filter, amplify, downconvert, and digitize) a respective received signal to obtain input samples. Each demodulator 1054 may further process the input samples (e.g., for OFDM, etc.) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate and decode) the detected symbols, provide decoded data for UE 120y to a data sink 1060, and provide decoded control information to a controller/processor 1080.

On the uplink, at UE 120y, a transmit processor 1064 may receive data from a data source 1062 and control information (e.g., messages for P2P communication and WAN communication) from controller/processor 1080. Processor 1064 may process (e.g., encode and modulate) the data and control information to obtain data symbols and control symbols, respectively. Processor 1064 may also generate symbols for a reference signal, a peer detection signal, etc. The symbols from transmit processor 1064 may be precoded by a TX MIMO processor 1066 if applicable, further processed by modulators 1054a through 1054r (e.g., for SC-FDM, OFDM, etc.), and transmitted to base station 110y, other base stations, and/or other UEs. At base station 110y, the uplink signals from UE 120y and other UEs may be received by antennas 1034, processed by demodulators 1032, detected by a MIMO detector 1036 if applicable, and further processed by a receive processor 1038 to obtain decoded data and control information sent by UE 120y and other UEs. Processor 1038 may provide the decoded data to a data sink 1039 and the decoded control information to controller/processor 1040.

Controllers/processors 1040 and 1080 may direct the operation at base station 110y and UE 120y, respectively. Processor 1080 and/or other processors and modules at UE 120y may perform or direct process 300 in FIG. 3, process 400 in FIG. 4, process 500 in FIG. 5, and/or other processes for the techniques described herein. Processor 1040 and/or other processors and modules at base station 110y may perform or direct process 600 in FIG. 6, process 700 in FIG. 7, and/or other processes for the techniques described herein. Memories 1042 and 1082 may store data and program codes for base station 110y and UE 120y, respectively.

A communication (Comm) unit 1044 may enable base station 110y to communicate with other network entities. A scheduler 1046 may schedule UEs for WAN communication and P2P communication.

FIG. 10 also shows a design of geolocation database server 140 in FIG. 1. Within server 140, a controller/processor 1090 may perform various functions to support unlicensed use of frequency bands. Controller/processor 1090 may receive a request from a base station or some other entity and may provide a list of frequency channels in an unlicensed band that may be available for use. A memory 1092 may store program codes and data for server 140. A storage unit 1094 may store a geolocation database of available frequency channels versus location. A communication unit 1096 may enable server 140 to communicate with other network entities.

In one configuration, apparatus 120x or 120y for wireless communication may include means for communicating with a WAN by a first UE to establish P2P communication with at least one other UE on a first frequency band that is not licensed to the WAN, means for communicating peer-to-peer with the at least one other UE on the first frequency band, and means for communicating with the WAN to maintain P2P communication with the at least one other UE.

In another configuration, apparatus 120x or 120y for wireless communication may include means for communicating P2P by a first UE with at least one other UE on at least one frequency channel in a frequency band that is not licensed to a WAN, means for monitoring the at least one frequency channel to detect usage of the at least one frequency channel by at least one licensed user of the frequency band, and means for terminating P2P communication on the at least one frequency channel when usage of the at least one frequency channel by the at least one licensed user is detected.

In yet another configuration, apparatus 120x or 120y for wireless communication may include means for receiving a list of frequency channels in a frequency band that is not licensed to a WAN, the list of frequency channels being available for use for P2P communication by a first UE, means for communicating peer-to-peer with at least one other UE on a first frequency channel in the list, means for deciding to perform handover from the first frequency channel to a second frequency channel in the list, and means for performing handover from the first frequency channel to the second frequency channel.

In one configuration, apparatus 110x or 110y for wireless communication may include means for communicating with a first UE in a WAN to establish P2P communication between the first UE and at least one other UE on a first frequency band that is not licensed to the WAN, and means for communicating with the first UE to maintain P2P communication between the first UE and the at least one other UE.

In another configuration, apparatus 110x or 110y for wireless communication may include means for communicating with at least one network entity in a WAN to determine at least one frequency channel available for use for P2P communication, the at least one frequency channel belonging in a frequency band that is not licensed to the WAN, and means for assigning the at least one frequency channel to UEs for P2P communication.

In an aspect, the aforementioned means may comprise processor(s) 1020, 1038 and/or 1040 at base station 110y and/or processors(s) 1058, 1064 and/or 1080 at UE 120y, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving a proximity detection signal by a first user equipment (UE) from at least one other UE;
sending a request to a wide area network (WAN) by the first UE to establish peer-to-peer (P2P) communication with the at least one other UE on a first frequency band not licensed to the WAN, in response to receiving the proximity detection signal from the at least one other UE;
receiving a query from the WAN for determining the capabilities of the first UE, the capabilities comprising whether the first UE is able to detect other UEs on the first frequency band;
determining at least a first frequency channel in the first frequency band available for P2P communication, based on the capabilities of the first UE; and
communicating peer-to-peer with the at least one other UE on the first frequency band by the first UE.

2. The method of claim 1, further comprising:
communicating with the WAN to maintain P2P communication with the at least one other UE.

3. The method of claim 1, wherein the communicating with the WAN comprises communicating with a serving base station of the first UE.

4. The method of claim 1, wherein the communicating with the WAN comprises communicating with the WAN on a second frequency band by the first UE, and wherein the WAN is licensed on the second frequency band.

5. The method of claim 1, further comprising:
performing handover from the first frequency channel to a second frequency channel in a list of frequency channels, in response to detecting usage of the first frequency channel by at least one licensed user of the first frequency band.

6. The method of claim 5, further comprising:
sending to the WAN an indication of the handover from the first frequency channel to the second frequency channel.

7. The method of claim 1, further comprising:
detecting P2P communication failure on the first frequency band; and
switching from P2P communication to communication via the WAN in response to detecting P2P communication failure.

8. The method of claim 1, further comprising:
sending a notification of P2P communication failure to the WAN;
receiving an indication to continue P2P communication on a second frequency band from the WAN, the WAN being licensed on the second frequency band; and
continuing P2P communication on the second frequency band in response to the indication from the WAN.

9. The method of claim 1, further comprising:
communicating peer-to-peer with the at least one other UE on a second frequency band on which the WAN is licensed.

10. The method of claim 9, wherein P2P communication on the second frequency band is more reliable but has lower capacity than P2P communication on the first frequency band.

11. The method of claim 1, wherein the first frequency band corresponds to a television white space spectrum.

12. An apparatus for wireless communication, comprising: means for receiving a proximity detection signal by a first user equipment (UE) from at least one other UE; means for sending a request to a wide area network (WAN) by the first UE to establish peer-to-peer (P2P) communication with the at least one other UE on a first frequency band not licensed to the WAN, in response to receiving the proximity detection signal from the at least one other UE; means for receiving a query from the WAN for determining capabilities of the first UE, the capabilities comprising whether the first UE is able to detect other UEs on the first frequency band; means for determining at least a first frequency channel in the first frequency band available for peer-to-peer communication, based on the capabilities of the first UE; and means for communicating peer-to-peer with the at least one other UE on the first frequency band by the first UE.

13. The apparatus of claim 12, further comprising:
means for communicating with the WAN to maintain P2P communication with the at least one other UE.

14. The apparatus of claim 12, further comprising:
means for performing handover from the first frequency channel to a second frequency channel.

15. The apparatus of claim 12, further comprising:
means for communicating peer-to-peer with the at least one other UE on a second frequency band on which the WAN is licensed.

16. A first user equipment (UE) for wireless communication, comprising: at least one processor configured receive a proximity detection signal from at least one other UE; send a request to a wide area network (WAN) to establish peer-to-peer (P2P) communication with at least one other UE on a first frequency band not licensed to the WAN, in response to receiving the proximity detection signal from the at least one other UE, receive a query from the WAN for determining capabilities of the first UE, the capabilities comprising whether the first UE is able to detect other UEs on the first frequency band; determine at least a first frequency channel in the first frequency band available for peer-to-peer communication, based on the capabilities of the first UE, and communicate peer-to-peer with the at least one other UE on the first frequency band.

17. The first UE of claim 16, wherein the at least one processor is configured to communicate with the WAN to maintain P2P communication with the at least one other UE.

18. The first UE of claim 16, wherein the at least one processor is configured to perform handover from the first frequency channel to a second frequency channel in a list of frequency channels.

19. The first UE of claim 16, wherein the at least one processor is configured to communicate peer-to-peer with the at least one other UE on a second frequency band on which the WAN is licensed.

20. A computer program product, comprising:
a non-transitory computer-readable medium comprising:
code for causing at least one processor to receive a proximity detection signal by a first user equipment (UE) from at least one other UE;
code for causing the at least one processor to send a request to a wide area network (WAN) by the first UE to establish peer-to-peer (P2P) communication with the at least one other UE on a first frequency band not licensed to the WAN, in response to receiving the proximity detection signal from the at least one other UE,
code for causing the at least one processor to receive a query from the WAN for determining capabilities of the UE, the capabilities comprising whether the first UE is able to detect other UEs on the first frequency band;
code for causing the at least one processor to determine at least one frequency channel in the first frequency band available for peer-to-peer communication, based on the capabilities of the first UE, and
code for causing the at least one processor to communicate peer-to-peer with the at least one other UE on the first frequency band by the first UE.

21. A method for wireless communication, comprising:
receiving a proximity detection signal by a first user equipment (UE) from at least one other UE;
communicating peer-to-peer (P2P) by the first UE with the at least one other UE on at least one frequency channel in a frequency band not licensed to a wide area network (WAN), in response to receiving the proximity detection signal from the at least one other UE;
monitoring the at least one frequency channel by the first UE to detect usage of the at least one frequency channel by at least one licensed user of the frequency band; and
performing at least one of: (1) handing over from the at least one frequency channel or to at least one other frequency channel in the frequency band or (2) switching from P2P communication to communication via the WAN, when usage of the at least one frequency channel by the at least one licensed user is detected or when performance degradation is detected on the at least one frequency channel.

22. The method of claim 21, wherein the monitoring the at least one frequency channel comprises sensing at least one characteristic of at least one signal transmitted by the at least one licensed user of the frequency band to detect usage of the at least one frequency channel by the at least one licensed user.

23. The method of claim 21, wherein the monitoring the at least one frequency channel comprises periodically sensing the at least one frequency channel by the first UE in each time interval of a particular duration while P2P communication is pending.

24. An apparatus for wireless communication, comprising:
means for receiving a proximity detection signal by a first user equipment (UE) from at least one other UE;
means for sending capabilities of the first UE to a wide area network (WAN), the capabilities comprising whether the first UE is able to detect other UEs on the first frequency band;
means for communicating peer-to-peer (P2P) by the first UE with the at least one other UE on at least one frequency channel in a frequency band not licensed to a wide area network (WAN), in response to receiving the proximity detection signal from the at least one other UE;
means for monitoring the at least one frequency channel by the first UE to detect usage of the at least one frequency channel by at least one licensed user of the frequency band; and
means for performing at least one of: (1) handing over from the at least one frequency channel or to at least one other frequency channel in the frequency band or (2) switching from P2P communication to communication via the WAN, when usage of the at least one frequency channel by the at least one licensed user is detected or when performance degradation is detected on the at least one frequency channel.

25. An apparatus A first user equipment (UE) for wireless communication, comprising:
at least one processor configured to:
receive a proximity detection signal from at least one other UE;
send capabilities of the first UE to a wide area network (WAN), the capabilities comprising whether the first UE is able to detect other UEs on the first frequency band;
communicate peer-to-peer (P2P) with the at least one other UE on at least one frequency channel in a frequency band not licensed to a wide area network (WAN), in response to receiving the proximity detection signal from the at least one other UE
monitor the at least one frequency channel by the first UE to detect usage of the at least one frequency channel by at least one licensed user of the frequency band; and
perform at least one of: (1) handing over from the at least one frequency channel or to at least one other frequency channel in the frequency band or (2) switching from P2P communication to communication via the WAN, when usage of the at least one frequency channel by the at least one licensed user is detected or when performance degradation is detected on the at least one frequency channel.

26. A computer program product, comprising:
a non-transitory computer-readable medium comprising:
code for causing at least one processor to receive a proximity detection signal by a first user equipment (UE) from at least one other UE;
code for causing the at least one processor to send capabilities of the first UE to a wide area network (WAN), the capabilities comprising whether the first UE is able to detect other UEs on the first frequency band;
code for causing the at least one processor to communicate peer-to-peer (P2P) by the first UE with the at least one other UE on at least one frequency channel in a frequency band not licensed to a wide area network (WAN), in response to receiving the proximity detection signal from the at least one other UE, code for causing the at least one processor to monitor the at least one frequency channel by the first UE to detect usage of the at least one frequency channel by at least one licensed user of the frequency band, and code for causing the at least one processor to perform at least one of: (1) handing over from the at least one frequency channel or to at least one other frequency channel in the frequency band or (2) switching from P2P communication to communication via the WAN, when usage of the at least one frequency channel by the at least one licensed user is detected or when performance degradation is detected on the at least one frequency channel.

* * * * *